(No Model.)

F. S. HUNTING.
TRANSFORMER.

No. 535,010. Patented Mar. 5, 1895.

Witnesses
E. C. Grigg.
John T. Murphy

Inventor
Fred S. Hunting
By his Attorneys

UNITED STATES PATENT OFFICE.

FRED S. HUNTING, OF FORT WAYNE, INDIANA.

TRANSFORMER.

SPECIFICATION forming part of Letters Patent No. 535,010, dated March 5, 1895.

Application filed February 25, 1892. Serial No. 422,301. (No model.)

*To all whom it may concern:*

Be it known that I, FRED S. HUNTING, a citizen of the United States, residing at Fort Wayne, in the county of Allen and State of Indiana, have invented certain new and useful Improvements in Transformers; and I do hereby declare the following to be a full, clear, and exact description of the invention, such as will enable others skilled in the art to which it appertains to make and use the same.

This invention relates to alternating current transformers, the object being to produce one or a number of independent currents of differing phase from two or more alternating currents of differing phase.

In carrying out the invention I prefer to operate with closed magnetic circuits in each of which the number of lines of force are caused to increase and decrease by the ebb and flow of the several alternating currents, and so wind the coils that a number of independent alternating currents may be produced in secondary circuits by the individual action or by the co-operation of groups of the several magnetic circuits.

The invention comprises a system of magnetic circuits resulting from two or more alternating currents of differing phase, two or more of the magnetic circuits being grouped to develope in the secondary coils phasially different secondary currents.

The invention also comprises other features of novelty which will be more particularly hereinafter described in the specification and definitely indicated in the appended claims.

Figure 1:
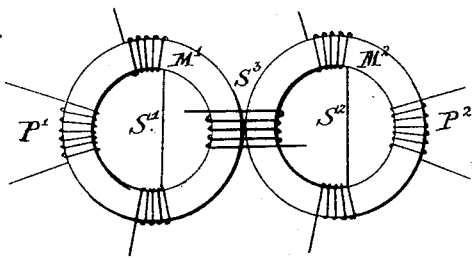
Figure 2:
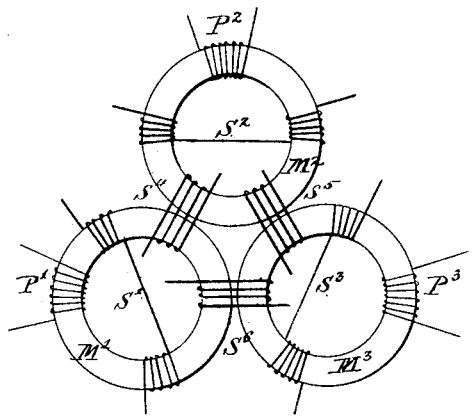
Figure 3:
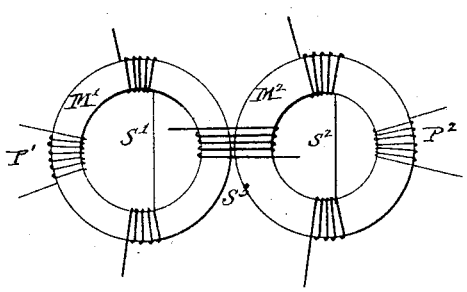

In the accompanying drawings, Figure 1 is a diagram illustrating the principle of my invention. Fig. 2 is a transformer in which a tri-phase alternating current is transformed into six currents differing from each other. Fig. 3 is a diagrammatic representation showing two magnetic circuits of different cross-sectional areas.

Referring now to Fig. 1, we will suppose that the primary coils $P'$ and $P^2$ are supplied with electric impulses differing in phase, and we will suppose that the currents in the two coils are of such a strength that the maximum number of lines of force induced in each of the magnetic circuits $M'$ and $M^2$ are the same. If, now, we have a secondary coil $S'$ wound upon the same magnetic circuit or core as $P'$, a secondary current will be developed in this coil differing in phase from the current flowing over $P'$ by a certain amount of lag, as is well understood by those familiar with alternating currents. Similarly, the secondary coils $S^2$ wound upon the core $M^2$ will contain a current differing in phase from the current flowing in $P^2$. If, now, we make the lines of force developed in cores $M'$ and $M^2$ conspire in action upon a third set of coils, as $S^3$, we will have an induced current developed in the coils $S^3$ by the joint action of currents flowing in $P'$ and $P^2$. The electro-motive-force induced in coils $S^3$ will be a resultant of the electro-motive-forces impressed upon the coils $P'$ and $P^2$, and in the case supposed, where the maximum number of lines of force in the two cores or magnetic circuits $M'$ and $M^2$ are equal, the resultant induced current in coils $S^3$ will be half way in point of time between the currents in $P'$ and $P^2$.

It will be understood that if the intensity of magnetization in the two magnetic circuits $M'$ and $M^2$ Fig. 1 be different, an effect which might be produced by varying the number of turns in primary coils $P'$ and $P^2$, or by any other suitable manner, the induced electro-motive-force in $S^3$ will be closer in phase to the electro-motive-force which develops the greater degree of magnetization; or if the intensity of magnetization, that is, the number of lines of force per unit area in the two magnetic circuits, be the same and said magnetic circuits be of different cross-sections as shown in Fig. 3 so that one will carry more lines of force than the other, the phase of the resultant current due to the two magnetic circuits will be closer to one than to the other. It will thus be seen that by combining two or more magnetic circuits influenced by two or more phasially different alternating currents any desired number of phasially different alternating currents from one upward may be produced, and that the number of induced currents may be greater or less than the number of inducing currents. The phase of the resultant current in any case may be shifted closer to one of the inducing currents by increasing the number of lines of force developed by that inducing current, or by increasing the number of turns in the induced circuit, or by a combination of the two.

In Fig. 2 I have illustrated three magnetic circuits influenced respectively by three alternating currents a third of a period apart, such as are used in a tri-phase alternating current system. The coils $P'$, $P^2$ and $P^3$ being primary coils and $S'$ $S^2$ $S^3$ $S^4$ $S^5$ and $S^6$ secondary coils, six different alternating currents will be developed in the secondary coils which by proper winding may be equidistant in phase or sixty degrees apart. By grouping the secondary coils of this system in different ways the number of phases developed in the secondary circuits may be varied as desired. For example, if $S'$ and $S^5$ were connected there would be induced in the combined circuit an electro-motive-force which is the resultant of the three electro-motive-forces in primary coils $P'$ $P^2$ $P^3$.

It will of course be understood that the transformer herein described is reversible; that is to say, a small number of secondary currents might be derived from a large number of phasially different primary currents.

It will be evident that open-magnetic circuits would produce results in all respects analogous to the closed circuits.

Having thus described my invention, what I claim as new, and desire to secure by Letters Patent, is—

1. A transformer for differential phase alternating currents comprising a plurality of magnetic circuits, a set of primary and a set of secondary coils, one of which sets has some of its coils inductively related to a single magnetic circuit and others to several magnetic circuits.

2. A polyphase transformer comprising two or more magnetic cores or circuits, primary coils for currents differing in phase, and a number of secondary coils some of which inclose single cores and others a plurality of cores.

3. A polyphase transformer comprising three cores, three coils for connection with a tri-phase line circuit wound on the respective cores, and six coils, three of which are wound upon the respective cores and three upon groups thereof, said six coils being adapted for connection with a local distribution circuit.

4. A polyphase transformer comprising two or more magnetic cores, primary coils for currents differing in phase, and one or more secondary coils each inclosing in its convolutions two or more of the several magnetic cores in multiple.

5. A polyphase transformer comprising two or more magnetic cores or circuits, primary coils for currents differing in phase, and a number of secondary coils some of which inclose single cores and others a plurality of cores in multiple.

6. A polyphase transformer comprising two or more inducing circuits for currents differing in phase, and one or more circuits for induced currents comprising in each in series a coil or coils wound upon a single core, and a coil or coils wound upon two or more coils in multiple.

7. A polyphase transformer comprising two or more circuits for inducing currents differing in phase, and cores influenced thereby so as to differ in inductive power, and a secondary circuit or circuits comprising in each a coil or coils wound upon two or more of the cores.

8. A polyphase transformer comprising two or more circuits for inducing currents differing in phase, and cores influenced thereby so as to differ in inductive power, and a secondary circuit or circuits comprising in each a coil or coils wound on two or more of the cores in multiple.

9. A polyphase transformer comprising two or more cores differing in effective cross-section with one or more secondary circuits comprising in each a coil wound upon two or more of the cores in multiple.

10. A polyphase transformer comprising two or more cores differing in the number of magnetic lines threading them respectively and in the phase of the magnetic flux of those lines, with one or more secondary circuits comprising in each a coil wound upon two or more of the cores in multiple.

In testimony whereof I affix my signature in presence of two witnesses.

FRED S. HUNTING.

Witnesses:
R. S. TAYLOR,
E. M. DUKE.